April 7, 1936.  C. V. ACHAUER ET AL  2,036,647
APPARATUS FOR ETCHING GLASS ARTICLES
Filed March 27, 1934  2 Sheets-Sheet 1
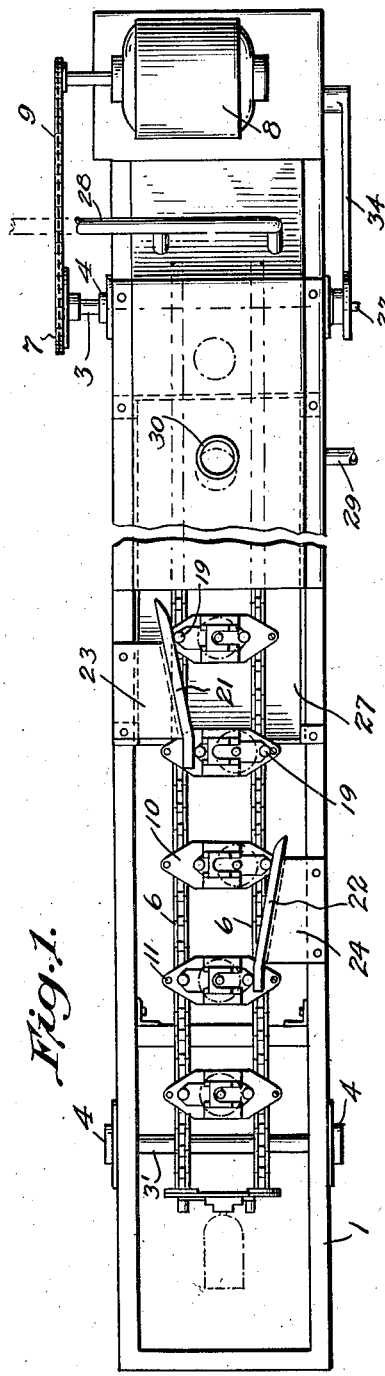
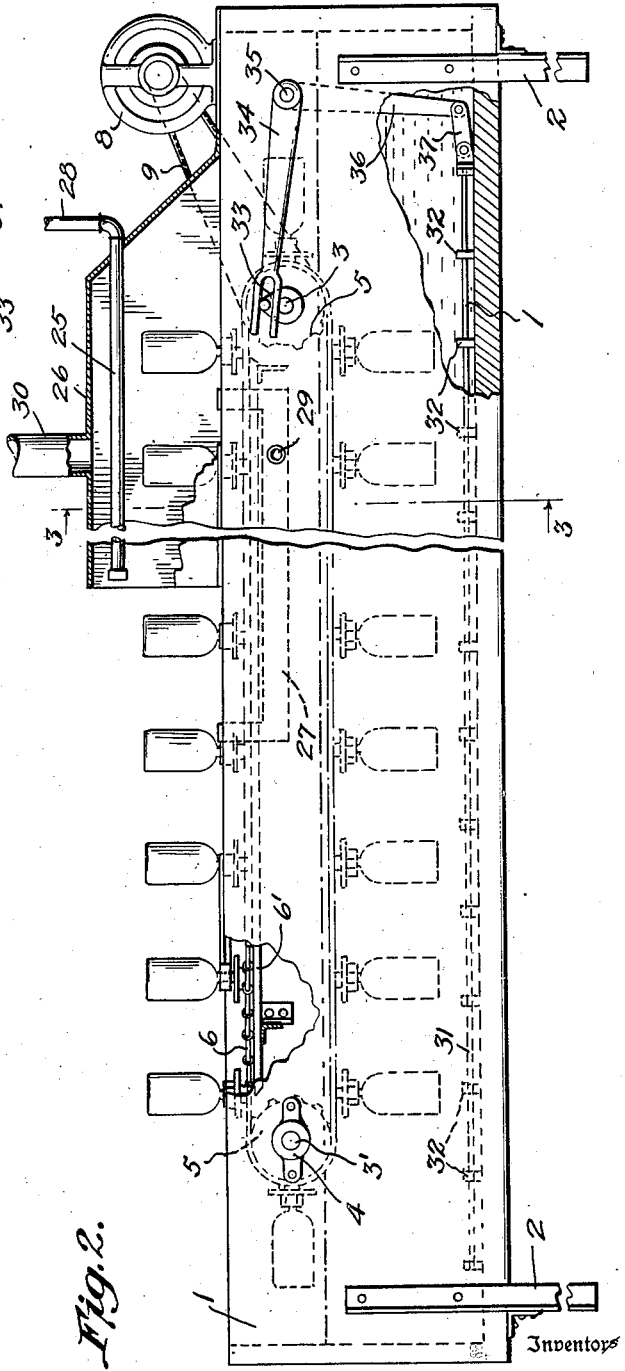
Inventors
Charles V. Achauer
Lorenzo Price
By Eccleston + Eccleston
Attorneys April 7, 1936.  C. V. ACHAUER ET AL  2,036,647
APPARATUS FOR ETCHING GLASS ARTICLES
Filed March 27, 1934   2 Sheets-Sheet 2
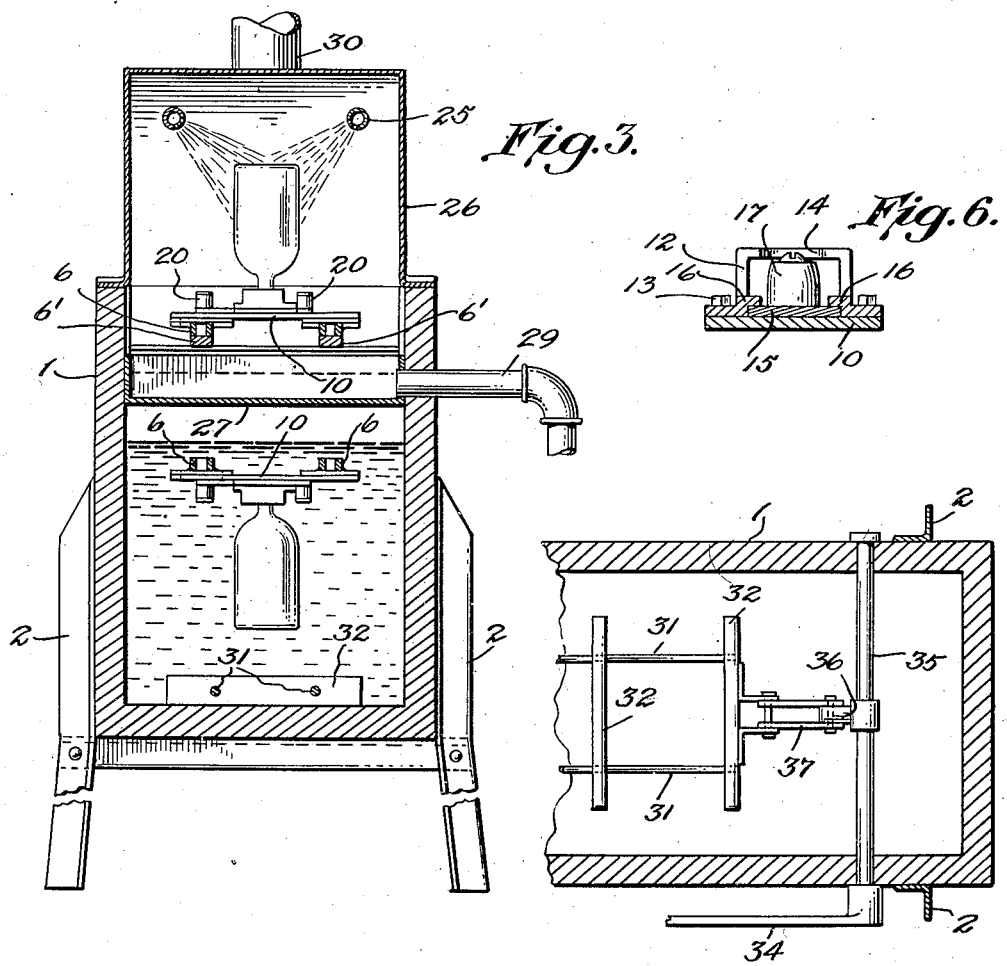

Patented Apr. 7, 1936

2,036,647

UNITED STATES PATENT OFFICE 2,036,647

APPARATUS FOR ETCHING GLASS ARTICLES

Charles V. Achauer, Philo, and Lorenzo Price, Zanesville, Ohio, assignors to Hazel-Atlas Glass Company, Wheeling, W. Va., a corporation of West Virginia Application March 27, 1934, Serial No. 717,640

6 Claims. (Cl. 41—9)

The present invention relates to a machine for continuously etching the exterior surfaces of glass bottles and other glass articles.

One of the objects of the invention resides in the provision of an apparatus including an endless and continuously operating conveyor for individually projecting the pieces of ware into a tank containing the etching or frosting fluid, and then carrying the ware along the length of the tank to the exit end where it is automatically lifted from the fluid.

Another object of the invention consists in the provision of an automatic gripping and releasing means, whereby the bottles are automatically and individually gripped as they are fed to the conveyor and are automatically released for removal after being raised from the etching fluid by the conveyor.

A further object of the invention resides in the use of a stopper, associated with each of the gripping means, for closing the mouth of each bottle prior to its being submerged in the etching fluid.

A still further object of the invention consists in the provision of means for washing the exterior surfaces of the ware after leaving the tank and prior to reaching the point of discharge, where the articles may be handled by an attendant.

Other objects and advantages of the invention will be apparent to those skilled in the art, from the following description when taken in connection with the accompanying drawings; in which, Figure 1 is a plan view of the apparatus.

Figure 2 is a side elevational view, parts being broken away to more clearly show the construction.

Figure 3 is a transverse, vertical sectional view taken on the line 3—3 of Figure 2.

Figure 4 is a detail plan view of one of the bottle gripping units.

Figure 5 is a vertical sectional view of one of said units showing a bottle in position thereon.

Figure 6 is a transverse sectional view taken on line 6—6 of Figure 4; and,

Figure 7 is a horizontal sectional view through one end of the tank.

Referring to the drawings in more detail, the numeral 1 indicates a tank for the etching or frosting fluid, supported on a suitable frame including the legs 2. Extending transversely of the tank adjacent the ends thereof are shafts 3, 3' mounted in bearings 4 and provided with pairs of sprocket wheels 5 for carrying conveyor chains 6. The upper flights of these conveyor chains travel over rails 6'.

The shaft 3 extends exteriorly of the tank and is provided with a sprocket wheel 7. An electric motor 8, or other suitable source of power, is mounted on the end of the tank, and through a chain 9 cooperating with wheel 7 provides the necessary driving means for the conveyor chains.

Extending across the chains 6 at suitably spaced intervals are carrier plates 10 having their ends secured to the chains by any desired means, as by bolts 11. Each plate 10 is provided with an inverted U-shaped gripper member 12 having its legs secured to opposite edges of the plate by bolts 13. The upper portion of each member 12 is cut away as indicated by numeral 14 to provide for the reception of the neck of a bottle.

Disposed between the legs of the members 12 are slides 15, and lugs 16 are bent down from each end of the members to serve as guides for the plates. A plug stopper 17, preferably of rubber, is fixed to each plate 15 by means of a bolt 18 and serves as a closure for a bottle mounted on the plate in inverted position.

As will be apparent the slides 15 are reciprocable, and the stoppers are so positioned on the slides that when the latter are moved to the right (Figures 4 and 5) the neck of the bottle is brought into the notched portion 14 of the gripper 12, causing the bead of the bottle to engage below the gripper whereby it is locked in position. It is to be understood of course that various forms of grippers may be substituted for that shown so as to adapt the device to a variety of types of bottle necks.

In order that the gripping and releasing of the bottles may be carried on automatically the slides 15 are each provided with rollers or the like 19 mounted on bolts 20 at each end of the slide. Cams 21 and 22 are provided for cooperation with the rollers 19 and are supported on opposite sides of the conveyor by plates 23 and 24 secured to the tank and spaced longitudinally thereof. When the carriers are successively brought abreast of the cam 21 the latter is engaged by the adjacent roller of slide 15 and the latter is moved transversely of the conveyor so as to remove the bottle from engagement with the gripper 12. The bottle is then removed by hand or otherwise and the particular carrier is ready to receive another bottle. This particular carrier is then advanced to a position abreast of cam 22. This cam is inclined toward the conveyor and when engaged by the adjacent roller 19 causes the slide to be moved to locking position with the bottle engaged in gripper 12.

The bottles travel through the etching fluid from left to right (Figure 2) and in order to remove any of the fluid remaining on the bottles a washing device is provided at this end of the tank. The washing consists merely of a pair of spray tubes 25 provided with discharge apertures directed toward the path of travel of the etched bottles, a hood 26 and a catch pan or basin 27. The sprays 25 are connected with a suitable source of water supply by a pipe 28 and the pan 27 is provided with an overflow or discharge pipe 29. The hood 26 and its stack 30 serve to confine the fumes given off by the etched bottles and convey them to a suitable point of discharge.

It is also highly desirable that the etching fluid in the tank be regularly agitated so as to avoid precipitation of any of its constituents, and for this purpose a pair of rods 31 provided with cross-bars 32 rest on the bottom of tank 1 and are continuously reciprocated longitudinally of the tank. The means employed for imparting this movement to the agitator includes a crank 33 mounted on one end of shaft 3 which is driven from the motor 8. The pin of crank 33 operates in the forked end of a lever 34 fixed to a shaft 35 oscillatably mounted in the side walls of the tank. A second lever 36 is fixed to shaft 35 and extends downwardly toward the bottom of the tank. This lever is attached to the agitator 31—32 by a link 37 which has its respective ends pivoted to the lever and agitator.

The operations of the various parts of the apparatus have been described in connection with the description of the structural details, and only a brief description of the apparatus as a whole will be necessary.

The proper type of gripper to suit the articles to be etched having been applied to the plates 10, and the tank 1 charged with etching fluid, the conveyor 6—6 is set in operation. The upper run of the conveyor travels from right to left (Figures 1 and 2) and the bottles to be etched are placed in inverted position on the stoppers 17 at a point between the cams 21 and 22. These stoppers perform a dual function, in that they support the bottle and prevent the etching fluid from entering the interior of the bottle. As the slides 15 carrying the stoppers successively reach the cam 22 they are forced transversely of the conveyor so as to bring the bottle neck into the notched portion 14 of the gripper 12. The bottle is now firmly locked to the conveyor and the continued travel of the latter carries the bottle into the etching fluid and through the same to the opposite end of the tank. This movement of the bottles through the fluid serves to maintain a certain amount of agitation of the fluid which is beneficial, and also serves to provide a continuous uniform contact of the bottle with the strong solution of fluid as distinguished from a mere submerging process in which the article soon becomes enveloped in a slurry or slush which hinders the effectiveness of the solution and may result in a patchy or blotched appearance on the surface of the bottle. The effectiveness of the solution is also maintained by the agitator 31—32 which is continuously operated as the bottles are drawn through the fluid.

As the pieces of ware reach the far end of the tank they are lifted from the etching fluid and pass under the water sprays 25. Here any of the chemicals remaining on the exterior of the bottles is removed and the fumes pass out through the stack 30. The etched and washed bottles now reach the cam 21 where the slide 15 is again forced transversely of the conveyor but in the opposite direction so as to release the bottle from the gripper 12 and permit its removal and the insertion of a new bottle.

From the foregoing description and attached drawings it will be apparent to those skilled in the art that we have provided a simple and inexpensive construction for continuously etching or frosting glassware; that novel means are provided for automatically gripping and releasing the ware; that this means also prevents entrance of the etching fluid into the interior of the pieces of ware; that an agitating means is provided for maintaining the fluid at its highest efficiency during operation of the apparatus; that by inserting the articles in the tank and carrying them throughout the length thereof, a supplemental agitation of the fluid is obtained, and this movement of the articles through the tank also insures a thorough and complete contact of the outer surface of the articles with the etching solution; and that the bottles are automatically washed as they emerge from the tank and before reaching the discharging station.

In accordance with the patent statutes we have described what we now believe to be the preferred form of the apparatus, but it will be obvious that many changes and modifications may be made without departing from the spirit of the invention, and all such changes and modifications are intended to be included within the scope of the appended claims.

What we claim is:

1. In an apparatus for continuously etching bottles, a tank, an endless conveyor for conveying bottles through etching fluid in the tank, a plurality of bottle-gripping units on said conveyor, each unit including a stopper to support a bottle and close the mouth thereof, and means for engaging another portion of the bottle to maintain it on the stopper.

2. In an apparatus for continuously etching bottles, a tank, an endless conveyor for conveying bottles through etching fluid in the tank, a plurality of bottle-gripping units on said conveyor, each unit including a stopper to support a bottle and close the mouth thereof, means for engaging another portion of the bottle to maintain it on the stopper, and means for causing a relative movement between the stopper and bottle-engaging means.

3. In an apparatus for continuously etching bottles, a tank, an endless conveyor for conveying bottles through etching fluid in the tank, a plurality of bottle-gripping units on said conveyor, each unit including a stopper to support a bottle and close the mouth thereof, means for engaging another portion of the bottle to maintain it on the stopper, and means cooperating with the conveyor for causing the opening and closing of the bottle gripping means.

4. In an apparatus for continuously etching bottles, a tank, an endless conveyor for conveying bottles through etching fluid in the tank, a plurality of bottle-gripping units on the conveyor, each unit including a slidably-mounted plate, a stopper on the plate for supporting a bottle and closing the mouth thereto, means for engaging another portion of the bottle to maintain it on the stopper, and means to move the plate to open and close the bottle gripping means.

5. In an apparatus for continuously etching bottles, a tank, an endless conveyor for conveying bottles through etching fluid in the tank, a plurality of bottle-gripping units on the conveyor, each unit including a slidably-mounted plate, a stopper on the plate for supporting a bottle and closing the mouth thereto, means fixed to the conveyor for engaging another portion of the bottle to maintain it on the stopper, and fixed means adapted to be engaged by the slide as it travels with the conveyor, to open and close the bottle gripping means.

6. In an apparatus for continuously etching bottles, a tank, an endless conveyor mounted on the tank for conveying bottles through etching fluid in the tank, a plurality of gripping units on the conveyor, each unit including a plate fixed to the conveyor, a second plate slidably mounted thereon, an inverted U-shaped member secured to one of said plates and adapted to engage a portion of a bottle, a closure secured to the other plate for engaging the mouth of a bottle, and means for operating the slidable plate through movement of the conveyor.

CHARLES V. ACHAUER.
LORENZO PRICE.